April 30, 1963 H. NEWMAN 3,087,356
METHOD OF SHARPENING TOOTHED ARTICLES OF SHARPENABLE MATERIAL
Original Filed Nov. 3, 1958 9 Sheets-Sheet 1

INVENTOR.
HUGO NEWMAN
BY J. Walton Bader
ATTORNEY

April 30, 1963     H. NEWMAN     3,087,356
METHOD OF SHARPENING TOOTHED ARTICLES OF SHARPENABLE MATERIAL
Original Filed Nov. 3, 1958     9 Sheets-Sheet 2

INVENTOR.
HUGO NEWMAN
BY J. Walton Bader
ATTORNEY

April 30, 1963   H. NEWMAN   3,087,356
METHOD OF SHARPENING TOOTHED ARTICLES OF SHARPENABLE MATERIAL
Original Filed Nov. 3, 1958   9 Sheets-Sheet 3

Fig. 5

INVENTOR.
HUGO NEWMAN
BY J. Walton Bader
ATTORNEY

April 30, 1963   H. NEWMAN   3,087,356
METHOD OF SHARPENING TOOTHED ARTICLES OF SHARPENABLE MATERIAL
Original Filed Nov. 3, 1958   9 Sheets-Sheet 4

INVENTOR.
HUGO NEWMAN
BY J. Walton Bader
ATTORNEY

April 30, 1963  H. NEWMAN  3,087,356
METHOD OF SHARPENING TOOTHED ARTICLES OF SHARPENABLE MATERIAL
Original Filed Nov. 3, 1958  9 Sheets-Sheet 6

INVENTOR.
HUGO NEWMAN
BY J. Walton Bader
ATTORNEY

April 30, 1963 H. NEWMAN 3,087,356
METHOD OF SHARPENING TOOTHED ARTICLES OF SHARPENABLE MATERIAL
Original Filed Nov. 3, 1958 9 Sheets-Sheet 7

INVENTOR.
HUGO NEWMAN
BY J. Walton Bader
ATTORNEY

Fig. 17

United States Patent Office 3,087,356
Patented Apr. 30, 1963

3,087,356
METHOD OF SHARPENING TOOTHED ARTICLES OF SHARPENABLE MATERIAL
Hugo Newman, New York, N.Y., assignor to Swingline Inc., Long Island City, N.Y., a corporation of New York
Original application Nov. 3, 1958, Ser. No. 771,321. Divided and this application Oct. 4, 1961, Ser. No. 142,930
25 Claims. (Cl. 76—101)

This invention relates to a method of sharpening toothed articles. Examples of sharpened toothed articles, to which this invention relates, are reamers, cutters and mills, etc. The invention is particularly related to cutters having helical teeth thereupon and flutes between adjacent pairs of teeth. Examples of such articles are pencil sharpener cutters, helical reamers, deburring tools and the like.

This is a divisional application, pursuant to Rule 147, of my parent application, Serial No. 771,321, filed November 3, 1958, entitled "Method of Sharpening Toothed Articles and Articles Produced Thereby."

Prior to the instant invention production of such articles was a long, costly and expensive process. The article would first have to be formed, in unsharpened condition, by means of conventional metal forming operations. Since a proper cutter edge could not be placed upon unhardened stock, it was then necessary, after formation of the unsharpened article, to harden the same (by heat treating, for example) and then grind the edges upon the article.

In addition to this being a costly, expensive and time-consuming process, it was wasteful of material, and required constant maintenance on the grinding wheels and corresponding adjustment of the grinding equipment.

The instant invention involves none of the previously discussed disadvantages. With the use of the instant invention sharpened edges can be created upon unhardened stock. The method of producing these edges also work-hardens the material so that heat treating (in some cases) can be dispensed with. If a very hard sharpened article is desired, it can be heat treated after formation and the edge will not be destroyed.

The articles upon which the method of this invention may be applied comprise a body portion (preferably longitudinal and cylindrical) and a tooth (preferably teeth and spaced from one another) projecting transversely from the body portion and bearing an edge thereupon. The article preferably is also formed with a fluted portion between each pair of adjacent teeth (where more than one tooth is present on the article). The tooth or teeth, the adjacent areas of the body portion, and the fluted portion may be termed the "peripheral portion" of the article.

The method of forming the articles of this invention may be briefly described as comprising the steps of alternately and sequentially applying along the tooth of the article first a radial pressure to the top thereof and thence a lateral pressure to the adjacent side thereof until the surfaces of the tooth subjected to the pressures form a cutting edge. In the preferred method of this invention the radial pressure is "rolling," that is, it is applied by a rolling motion, and the lateral pressure is "ironing," that is, it is applied by the pressure producing member both angularly and parallel at the same time. This type of pressure is the type produced when a housewife uses an iron to press clothes.

The method of this invention can most easily be carried out by utilizing a sharpening member having teeth but where the angle of said teeth is different than the angle of the teeth of the article. The article and sharpening member are then placed in rotatable pressure impingement with one another until the edges are formed. The invention will be further described by reference to the accompanying drawings which are made a part of this specification.

FIG. 18 is a somewhat diagrammatic perspective view of the ends of the toothed article and its adjacent sharpening member in rotatable pressure impingement with one another. The ends of the toothed article and adjacent sharpening members shown are those ends which are adjacent the chuck which holds the article to be sharpened and rotates the same. The chuck itself is not shown in this figure.

FIG. 19 is a greatly enlarged detail view of a portion of the elements shown in FIG. 18. The enlarged portion shown is designated by the circle 19 of FIG. 18. FIG. 19 also shows the direction of grain lines within the material composing the cutting edges formed by the method of this invention.

By the use of the drawings to aid in the detailed description of this invention, and with the detailed description itself, one skilled in this art may proceed to practice the same. However, before commencing the detailed description the reader is cautioned that the specific description and the drawings showing a preferred manner of practicing this invention are merely for illustrative purposes and for purposes of example. Various changes and modifications can obviously be made within the spirit and scope of the invention. The scope of the invention is to be determined solely by the scope of the appended claims.

Figure 1:
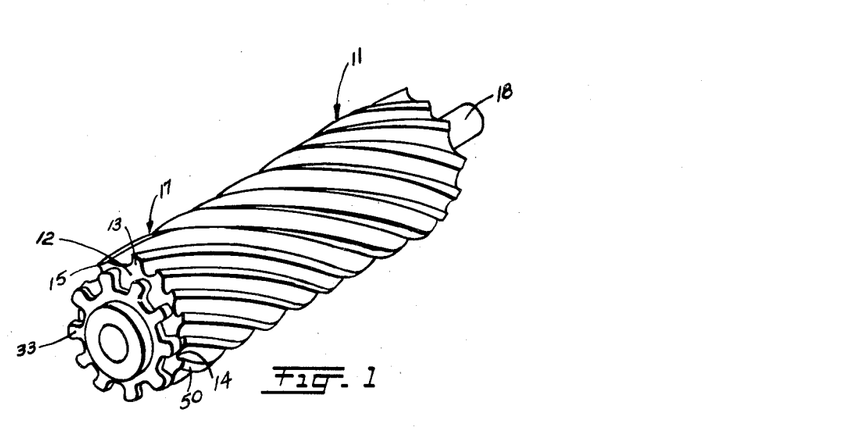
FIG. 1 is an isometric perspective view of a toothed article as used in a pencil sharpener sharpened in accordance with this invention.
Figure 15:
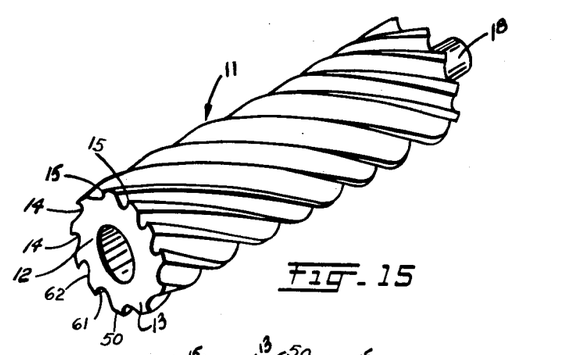
FIG. 15 is an isometric perspective view of a toothed article sharpened in accordance with this invention.

The sharpened article produced by the method of this invention is most clearly shown in FIGS. 1 and 15. The article is, of course, also shown in other figures of the drawings, and is given the general reference character 11. Article 11 includes a body portion 12 which is preferably substantially cylindrical and longitudinal. A plurality of spaced helical teeth 13 project from body portion 12, and a fluted portion 14 is disposed between each pair of adjacent teeth 13.

Each of teeth 13 is formed with a leading side 61, a following side 62 and a top portion 50. A cutting edge 15 is formed by the method of this invention on the leading side 61 of article 11.

Where article 11 is to be used as a pencil sharpener cutter, it is preferable to provide a central opening 38 therewithin so that a shaft 18 and a gear 33 may be secured thereto. Also, where the cutter is to be used as a pencil sharpener cutter, the body is preferably tapered at one end 17 to a taper of about 2 degrees.

Also when article 11 is to be used as a pencil sharpener cutter, the dimensions used are those generally applied to pencil sharpener cutters. The length of such cutters generally ranges from 1″ to 3″, the diameter from .50 to 1″, the helical angle of the teeth from 30 degrees to 60 degrees, the pitch from 1/16″ to 1/4″, the lead from 1/2″ to 2″ and the number of starts from 4 to 20. However, it is pointed out that these dimensions are not critical but merely are those generally used for the purpose. Conceivably other dimensions outside of these ranges could also be used.

The cutter 11 is generally made of low carbon heat hardenable steel such as screw machine bar stock.

Figure 17:
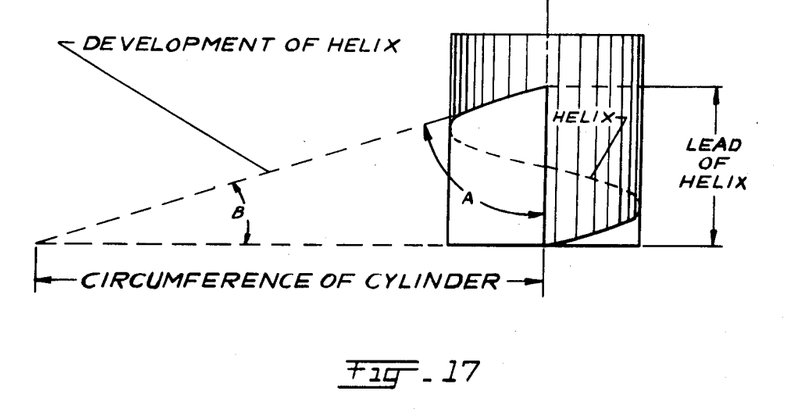
FIG. 17 is a view showing what is meant by the term "helical angle" as used in this specification and in the claims.

Before discussing the method used to produce the article of this invention FIG. 17 of the drawings will be discussed. Since the term "helical angle" is used both in the specification and claims, FIG. 17 shows what is meant by the term. The figure also shows what is meant by the term "lead" as used in the specification. The "helical angle" referred to in this specification is angle B. However, angle A is sometimes designated as "helical angle." If angle A is used, the degree values and limits set forth in this specification would then have to be translated to the proper values for angle B.

The method of producing the articles of this invention will now be described in detail. The detailed description will be set forth with respect to helical toothed articles but this invention is not limited to articles having this form of tooth. Other types of toothed articles may also conceivably be made.

The first step in carrying out the method of this invention is to obtain an unsharpened toothed article, of the proper size and of the proper number of teeth, preferably made of heat hardenable low carbon steel (such as screw machine stock). Such an article is generally made by taking a piece of untoothed bar stock and then cutting teeth thereupon by means of a broach, milling cutter, etc. Where helical teeth are cut, a fluted portion is preferably produced between each adjacent pair of teeth.

The diameter, pitch, lead, circular pitch, length of cutter, shape of the teeth, and helical angle of the teeth can be of any values which can be produced. The values chosen will be dependent upon the use of article to be made.

After the unsharpened article is chosen it is then sharpened by the method of this invention. As previously stated, this method consists of the alternate and sequential application of radial (preferably rolling) and lateral (preferably ironing) pressures to the teeth of the article until the surfaces of the teeth subjected to such pressures define a cutting edge. However, the method can most economically be carried out by the use of sharpening members as will be now explained in detail.

Figure 2:
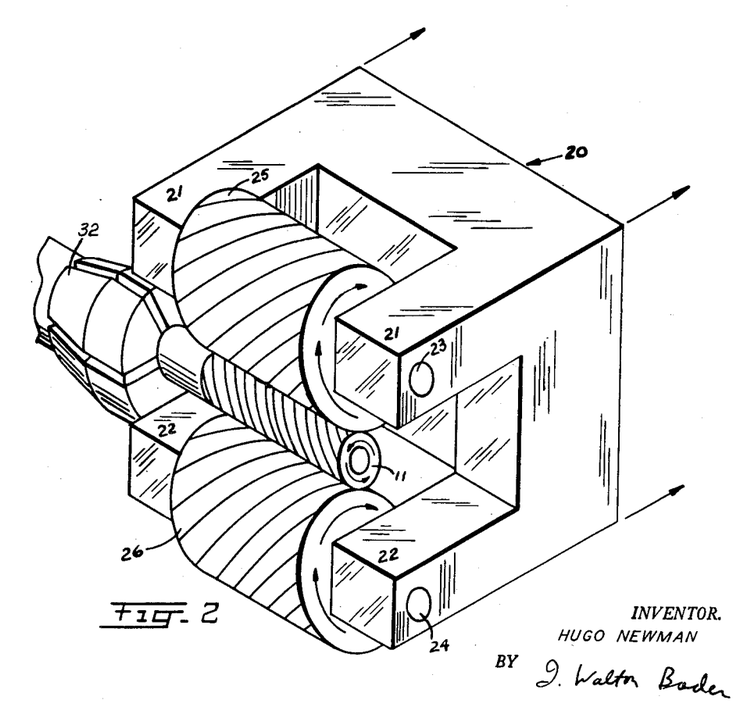
FIG. 2 is an isometric perspective view of the manner in which the toothed article may be sharpened by the use of the method described in this application when sharpening members are used.
Figure 3:
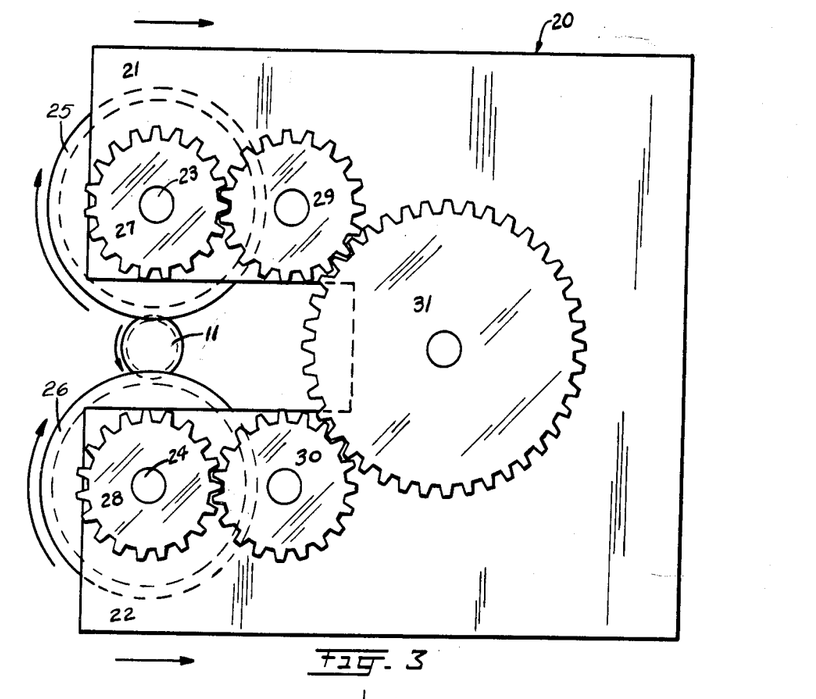
FIG. 3 is a diagrammatic side view of the manner in which the toothed article may be sharpened by the use of sharpening members.

FIGS. 2 and 3 of the drawings show a fixture that can be used to carry out the sharpening method of this invention. A holder 20 bears support portions 20, 21 and 22. Shafts 23 and 24 are turnably secured within support portions 21 and 22. Shafts 23 and 24 are also secured to sharpening members 25 and 26 and also to gears 27 and 28. Gears 27 and 28 are in turn in meshing engagement with gears 29 and 30 and gears 29 and 30 are in meshing engagement with gear 31. Gear 31 constitutes a control gear and causes both sharpening members 25 and 26 to rotate at the same rate.

The article 11 to be sharpened is rotated by means of chuck 32 which is powered by means of a conventional external power mechanism (not shown).

The article to be sharpened and the sharpening members are in rotatable pressure impingement with one another.

Continuing our description of the method of this invention and again returning to the original unsharpened article, we can assume if we desire, for the purpose of clarifying the description, that the article chosen is within the dimensional range of pencil sharpener cutters. In such case, a diameter of .5 inch, a helical angle of 45 degrees, a length of 2 inches, 11 teeth on the cutter, and a 2 degree taper at one end theeof, will be the general dimensions used. The form of the teeth will be similar to that shown in FIG. 1.

However, the reader is cautioned to note that these dimensions are not to be taken as any limitation whatsoever upon the articles which may be sharpened by the method of this invention. Indeed, even where pencil sharpener cutters are to be made, the dimensions can vary considerably from those given here. The dimensions are not critical in any manner whatsoever but are merely given as an illustration of those dimensions that can be used.

Sharpening members 25 and 26 will now be prepared. In this connection the reader is informed that the form of the teeth of the sharpening members will be dependent upon the form of the teeth of the article to be sharpened.

Where a fluted article is to be sharpened, the form of the teeth of the sharpening member should be, if optimum results are to be obtained, substantially complementary to the form of the flutes of the article to be sharpened.

Figure 4:
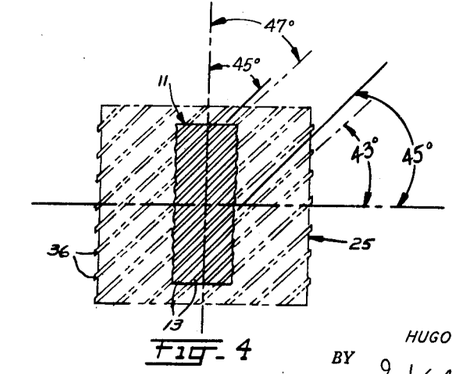
FIG. 4 is a diagrammatic view of the angular differences between the teeth of the sharpening member and of the article to be sharpened.
Figure 5:
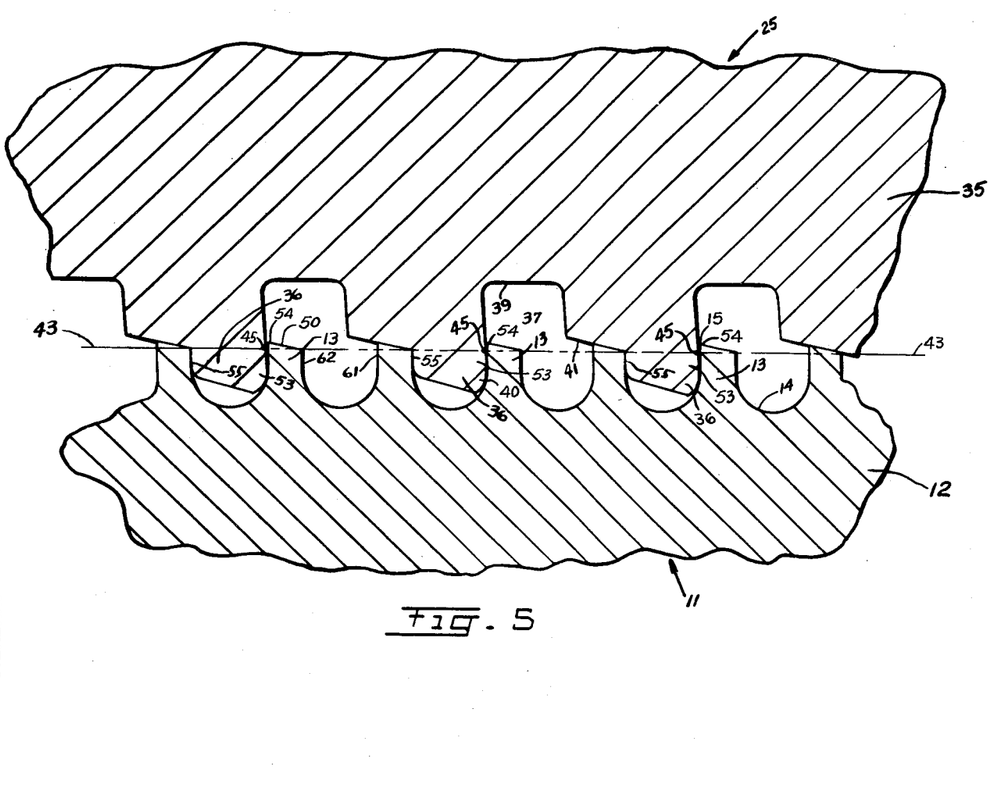
FIG. 5 is an enlarged longitudinal sectional view through the center of a toothed article being sharpened and the center of its adjacent sharpening member showing the relationship of the teeth to one another.

The helical angle of the teeth of the sharpening member, however, is different from the helical angle of the teeth of the article to be sharpened. This angular difference ranges from 15 seconds to 5 degrees. The preferred range is 30 minutes to the 2 degrees shown in FIG. 4. Where the specific method of sharpening set forth in this specification is used, the helical angle of the teeth of the sharpening member is less than the helical angle of the teeth of the article to be sharpened (when the helical angle is defined (as shown in FIG. 17)).

In the specific method of sharpening shown in the drawings, and where the specific sharpening member set forth therein is employed, the spacing between adjacent teeth of the sharpening member is at least twice the spacing between adjacent teeth of the article to be sharpened. This is required so that necessary pressures can be produced.

There is a limitation, however, with respect to the spacing between the adjacent teeth of the sharpening member, in that the spacing must be an exact multiple of the spacing between the teeth of the article to be sharpened. That is the spacing can either be 2, 3, 4, 5, 6, etc., times the spacing between adjacent teeth of the article to be sharpened but cannot be 2¼ times, 3⅛ times, etc., the spacing involved.

Also, in the preferred construction of the sharpening members shown in the drawings of this application, each of the teeth of the sharpening members are formed with root and crown portions and an adjacent laterally extending shoulder portion terminating short of the crown. In the most preferred modification the shoulder portion is adjacent the following side portion of the tooth of the sharpening member and is downwardly inclined toward the following side portion of the tooth. Where the above form of shoulder portion is used it is complementary to the top portion of the engaged tooth of the metallic article which portion is downwardly inclined toward its following side portion.

Using the specific constructions set forth in this application, the specific method, merely for illustration, of the specific modifications of elements shown will now be explained in detail. This will be done by explaining the process of manufacture of a cutter similar to those shown in the various figures of the drawings.

The first step in such manufacture is to predetermine the diameter, shape, number of teeth, shape of teeth, helical angle of teeth and length of article. The values selected will depend upon the type of article to be manufactured and the use to which the article is to be put. Since the values are predetermined prior to carrying out the method of this invention, the specific figures involved are unimportant. However, once the figures are selected the dimensions of the sharpening member or members (if such members are used) will be somewhat determined by the original dimensions selected for the article.

Figure 6:
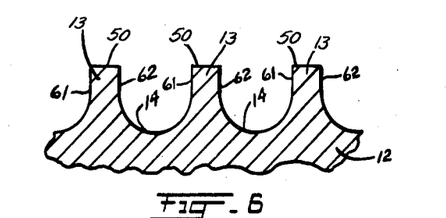
FIG. 6 is an enlarged longitudinal sectional view through the center of a fluted toothed article before sharpening the same by the method of this invention.
Figure 7:
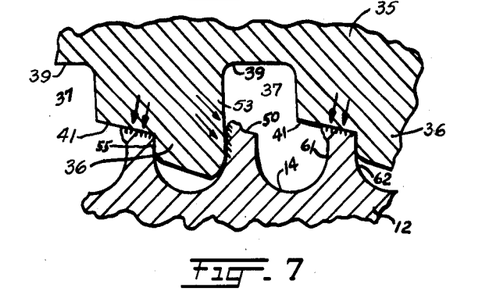
FIGS. 7 and 8 are enlarged longitudinal sectional views through the center of a toothed article and the center of its sharpening member while being sharpened by the method of this invention showing the directions of pressure application and the form assumed by the portions sharpened.
Figure 8:
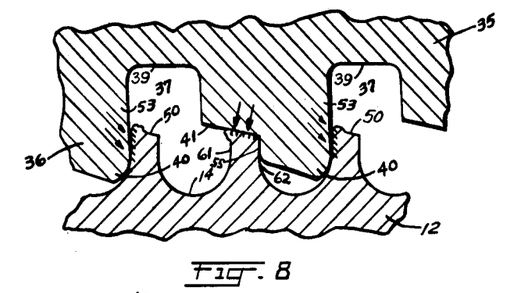

Assuming that the article to be manufactured is to be a cutter for use in a pencil sharpener or the like, it is first produced in unsharpened condition by milling, broaching, or similar process. The initial form of the cutter will be similar to the showing in FIG. 6 of the drawings.

Subsequent to the preparation of the unsharpened cutter, a sharpening member or, in the preferred construction of this invention, a pair of sharpening members, are now obtained to do the required sharpening of the unsharpened cutter. The sharpening members are shown in FIGS. 2, 3, 4, 5, 7, 8, 10, 11, 18 and 19 of the drawings. The sharpening members are generally indicated by reference characters 25 and 26 and each comprise a body portion 35, a plurality of spaced projecting peripheral helical teeth 36, a space 37 between each pair of adjacent teeth, and preferably a central opening 38 which permits the insertion of a shaft for rotation thereof. Each of teeth 36 is formed with a root portion 39, a crown portion 40, and a laterally extending shoulder portion 41 which terminates short of the crown. Each of teeth 36 is also formed with a leading side 53 and a following side 55 and the shoulder portion 41 is downwardly inclined towards the following side of each of teeth 36. The helical angle of each of teeth 36 is different (less in the preferred modification) than the helical angle of the teeth 13 of the article to be sharpened.

In order to apprise the reader of the point at which the helical angle is determined (since some shapes of teeth could conceivably result in a number of possibilities) the line 43 is shown which illustrates the place 40 from which the helical angle is taken on the sharpening member. The place from which the helical angle is taken upon the article to be sharpened in indicated at 54.

In order to determine the diameter of the sharpening member and the number of teeth to be placed thereupon the following formula can be employed:

$$\frac{\pi D}{N} = \frac{\pi DD}{NN}$$

where D is the diameter of the article to be sharpened, DD is the diameter of the sharpening member, N is the number of teeth in the article to be sharpened and NN is the number of (double) teeth in the sharpening member. The value of NN gives twice the number of teeth as are actually to be placed upon the sharpening member since the spacing between adjacent teeth of the sharpening member is twice that as between the teeth of the article to be sharpened.

The sharpening member can be used with a triple spacing between adjacent teeth and such a spacing can be obviously worked out by one skilled in the art.

The values of N and D are known and the value of NN can be selected. Therefore DD can be simply computed. However, in order to carry out such computation, the value of NN must be even so that the number of teeth used in the formula can be halved after the diameter is determined.

After determination of number of teeth to be used in the sharpening members, the shape of the teeth is then determined. For best results the shape of the teeth 36 (aside from the laterally extending shoulder portion 41) is preferably complementary to the shape of the flutes 14 of the article to be sharpened. Laterally extending shoulder portion 41 should be at least as wide as the width of the top portion 50 of the tooth 13 which it overlies in operation. For best production of the pressures required shoulder portion 41 should be downwardly inclined toward the following side 53 of the tooth 36 of which it is a part.

Figure 9:
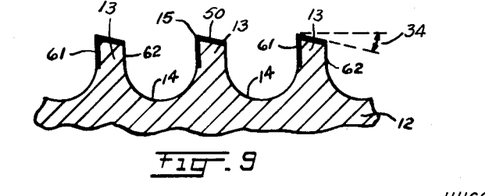
FIG. 9 is an enlarged longitudinal sectional view similar to FIG. 6 but showing the article after sharpening and showing how the material upon the sharpened edge thereto becomes densified.
Figure 10:
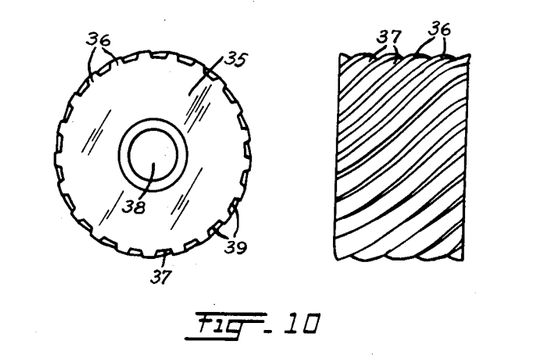
FIGS. 10 and 11 are front and side views of forms of sharpening members employed depending upon the specific form of the article to be sharpened.
Figure 11:
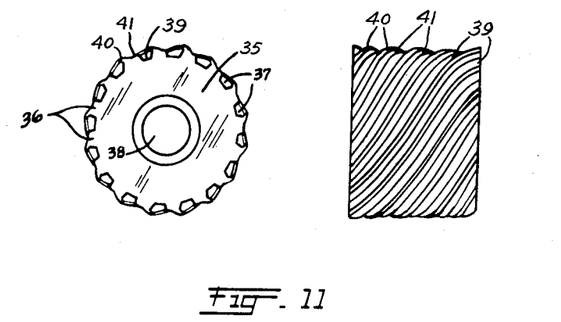
Figure 12:
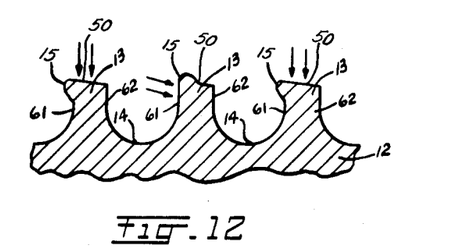
FIGS. 12, 13 and 14 are longitutdinal sectional views through the center of a toothed article while being sharpened showing the directions of successive pressure applications and the form that the edges take during such pressure applications.
Figure 13:
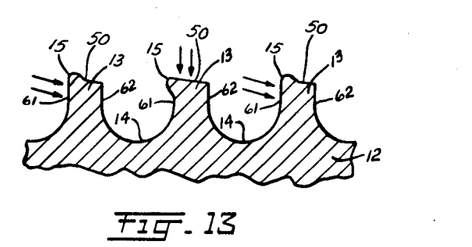
Figure 14:
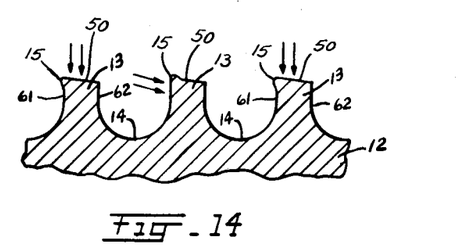

In the manufacture of cutters for pencil sharpeners or the like the top portions 50 of each of teeth 13 of the article in its sharpened condition are also downwardly inclined away from the leading sides 61 thereof so as to produce a so-called "back-off" angle 34 (FIG. 9). The cutter in unsharpener condition does not have such back-off angle but the top portions 50 of the article in unsharpened condition are straight across. The size of the back-off angle is determined by the inclination given to shoulder portion 41 of teeth 36.

Sharpening members 25 and 26 are then placed into rotatable pressure impingement with the article 11 to be sharpened. A crown portion 40 of a tooth 36 of the sharpening members 25 and 26 is placed between a pair of adjacent teeth 13 of the article to be sharpened. A laterally extending shoulder portion 41 of tooth 36 is placed in downwardly engageable relationship with a top portion 50 of a tooth 13. Since there is a helical angular difference between the teeth of the sharpening members and the corresponding teeth of the article to be sharpened as the elements rotate together, alternate lateral ironing pressures are exerted upon the leading side 61 of each of teeth 13 by the leading side 53 of each of teeth 36 and alternate radial rolling pressures are exerted upon the top portion 50 of each of teeth 13 by the laterally extending shoulder portion 41 of each of teeth 36. Since, in the preferred construction of the sharpening member the direction of the laterally extending shoulder portion is downwardly toward the following side 53 of each of teeth 36 the pressure is exerted towards said leading side and the sharpening member tends to be held into engagement with the article to be sharpened.

In the manufacture of cutters for pencil sharpeners or the like, the top portions 50 of each of teeth 13 of the article in its sharpened condition are also downwardly inclined away from the leading sides 61 thereof so as to produce a so-called "back-off" angle 34 (FIG. 9). The cutter in unsharpened condition does not have such back-off angle but the top portions 50 of the article in unsharpened condition are straight across. The size of the back-off angle is determined by the inclination given to shoulder portion 41 of teeth 36.

The placing of sharpening members 25 and 26 and article 11 into rotatable pressure impingement with one another can most conveniently be done by moving holder 20 carrying rollers 25 and 26 into contact with article 11, which is rotatably moved by being secured to rotating chuck 32. Holder 20 is moved in the direction opposite to that shown by the arrows at the base of holder 20 in FIG. 2.

Impingement of sharpening members 25 and 26 and article 11 is performed for a sufficient length of time to produce an edge 15 on the teeth 13 of article 11. Care must be taken not to prolong the process for a longer time than necessary to prevent destruction of the edge. The time involved depends upon the speed of rotation of the work and the materials used. Generally, with rotational speeds of about 1000 r.p.m. and with screw machine stock as the material involved, the time involved is about 3 seconds. However, this time is not critical and will, of course, vary depending upon variance of the above factors.

After the cutting edge 15 has been produced upon teeth 13 of article 11 holder 20 is moved in the direction of the arrows at the base thereof so that sharpening members 25 and 26 are moved out of rotatable pressure impingement with article 11.

Figures 18, 19:
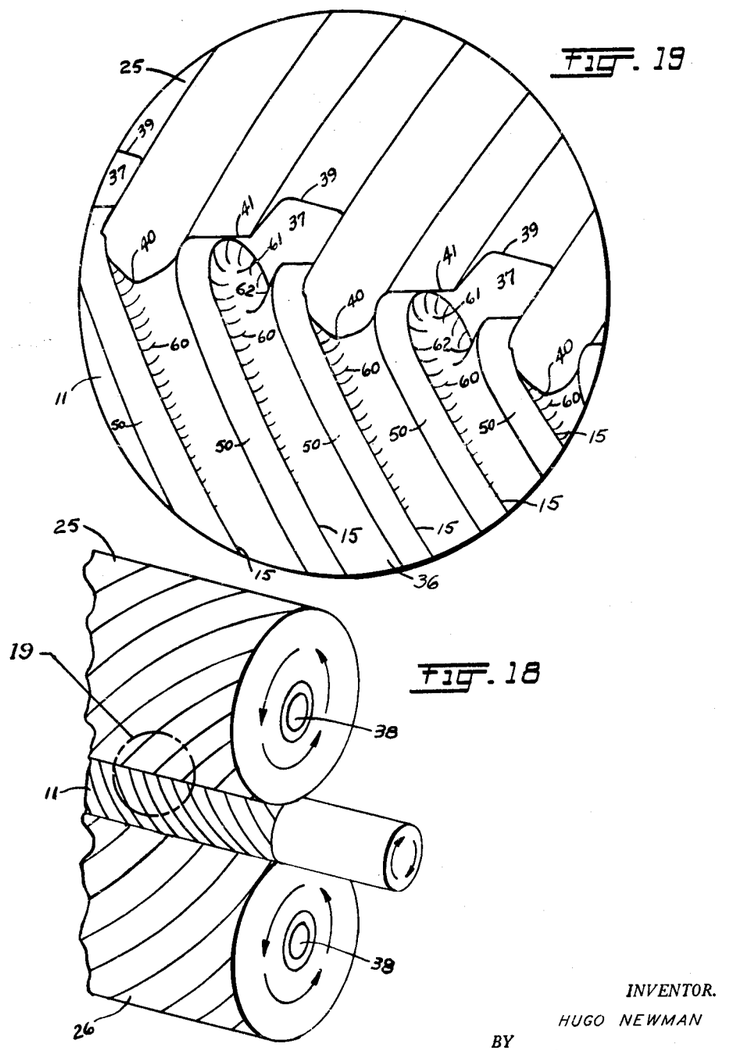

The direction of rotation of article 11 and sharpening members 25 and 26, when these members are engaged, is shown by the arrows upon the parts in FIGS. 2 and 18 of the drawings.

FIGS. 7, 8, 12, 13 and 14 show the sequence of steps involved in the formation of cutting edges upon the teeth of the article to be sharpened. As shown in these figures the pressures produced, which are alternately radial and lateral, first push the material composing the upper segment of leading side portions 61 of each of teeth 13 downwardly and outwardly and thence inwardly and upwardly. The successive deformations of the material form the same into a cutting edge.

Figure 16:
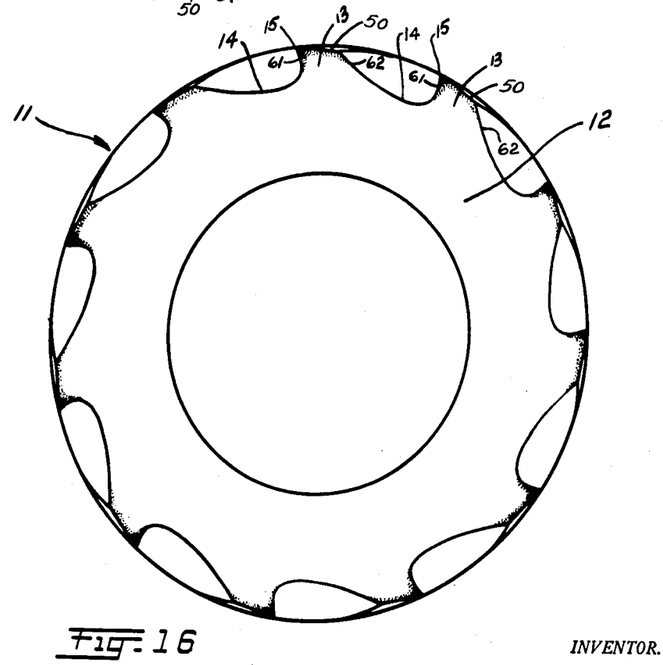
FIG. 16 is an enlarged end view of the article of FIG. 15 showing the densification of the material of the article after being produced by the method of this invention in great detail.

Because of this method of formation of the edge the material composing the same is densified. This densification is shown in FIGS. 9 and 16 of the drawings. The reader is also informed that if the crown portions of the teeth impinge upon any other part or parts of the peripheral portion of the article to be sharpened, there will also be some densification in the areas of impingement. However, the principal densification of the material is as shown in FIGS. 9 and 16 of the drawings.

In the areas of principal densification the most extreme densification occurs upon the actual cutting edge itself with the densification decreasing in a direction receding from the cutting edge. This is shown quite clearly in FIG. 16 of the drawings.

The process of sharpening as set forth in this specification also causes changes in the grain structure of the article. These changes are shown in FIG. 19 of the drawings. The normal direction of the grain lines of the article (assuming the article to be originally produced by being longitudinally drawn) would run longitudinally substantially parallel to the longitudinal axis of the article. However, in sharpening the article in accordance with the method of this invention, the grain lines 60 within the material composing edge portion 15 extend between edge portion 15 and the body portion 12. Where the sharpening members as set forth in this application are used to produce the sharpened article, the grain lines also assume a generally arcuate configuration and extend between the edge portion 15 and tangentially to the bottom of an adjacent flute 14.

Before concluding this specification there are certain cautions that the reader should bear in mind. If a pair of the specific sharpening members used in the specific example of the method of this invention illustrated in this specification are used, and if the sharpening members are both identical in form, then it will be necessary that the cutter have an odd number of teeth.

Furthermore, when the sharpening members 25 and 26 are used as shown in FIGS. 2 and 18, and are placed into rotatable pressure impingement with the cutter 11, the crown portions 40 of each of teeth 36 may not immediately become disposed in the correct position which is between teeth 13. However, since sharpening members 25 and 26 exert pressure upon cutter 11, and since the parts rotate together, the crown portions 40 of each of teeth 36 will, after one or two revolutions, dispose themselves in operative position.

While the structure shown in FIGS. 2 and 18 will produce the necessary rotatable pressure impingement of the parts, it must be understood that other structures will also be satisfactory. For example, shafts 23 and 24 can be held into position by spring means which will permit displacement of the shafts outwardly upon exertion of pressure thereupon so that the pressure applied to cutter 11 can be held within close limits.

As previously stated a back-off angle 34 can be produced by the use of shoulder portion 41. In the preferred modification of this invention the size of back-off angle can be easily determined by the inclination given to shoulder portion 41 when sharpening members 25 and 26 are prepared.

I claim:

1. A method of forming a cutting edge upon a metallic article formed with a body portion and a projecting tooth thereupon comprising the steps of alternately and sequentially applying along said tooth first a radial rolling pressure to the top of tooth and thence a lateral ironing pressure to an adjacent side portion of said tooth until the surfaces of said tooth subjected to said pressures create a cutting edge.

2. A method of forming a cutting edge upon a metallic article having a body portion and a plurality of spaced projecting teeth thereupon comprising the steps of alternately and sequentially applying along said teeth first a radial rolling pressure to the tops of said teeth and thence a lateral ironing pressure to the adjacent side portions of said teeth until the surfaces of said teeth subjected to said pressures create cutting edges.

3. A method of forming cutting edges upon the teeth of a metallic article having a body portion and a plurality of spaced projecting teeth thereupon comprising the steps of alternately and sequentially applying along said teeth first a radial rolling pressure to the tops thereof and thence a lateral ironing pressure to the adjacent sides thereof until the surfaces of said teeth subjected to said pressures create a cutting edge.

4. A method of forming cutting edges upon the teeth of a metallic article having a longitudinal body portion and a plurality of spaced transversely disposed projecting teeth thereupon comprising the steps of alternately and sequentially applying along the longest dimension of said teeth first a radial rolling pressure to the top portions thereof and thence a lateral ironing pressure to the adjacent sides thereof until the surfaces of said teeth subjected to said pressures create a cutting edge.

5. A method of forming cutting edges upon the teeth of a metallic article having a substantially cylindrical longitudinal body portion and a plurality of spaced transversely disposed projecting teeth thereupon comprising the steps of alternately and sequentially applying along the longest dimension of said teeth first a radial rolling pressure to the top portions thereof and thence a lateral ironing pressure to the adjacent sides thereof until the surfaces of said teeth subjected to said pressures create a cutting edge.

6. A method of forming cutting edges upon the teeth of a heat hardenable steel article having a substantially longitudinal body portion, a plurality of spaced transversely disposed projecting teeth thereupon, and a fluted portion between each pair of adjacent teeth, comprising the steps of alternately and sequentially applying along the longest dimension of each of said teeth first a radial rolling pressure to the top portions thereof and thence a lateral ironing pressure to the adjacent sides thereof until the surfaces of said teeth subjected to said pressures create a cutting edge.

7. A method of forming cutting edges upon the teeth of a heat hardenable steel article having a substantially longitudinal cylindrical body portion, a plurality of spaced transversely disposed helical teeth thereupon, and a fluted portion between each pair of adjacent teeth, comprising the steps of alternately and sequentially applying along the longest dimension of each of said teeth first a radial rolling pressure to the top portions thereof and thence a lateral ironing pressure to the adjacent side portions thereof until the surfaces of said teeth subjected to said pressures create a cutting edge.

8. A method of forming cutting edges upon the teeth of a heat hardenable steel article having a substantially cylindrical longitudinal body portion, a plurality of spaced transversely disposed helical teeth thereupon, and a fluted portion between each pair of adjacent teeth, comprising the steps of alternately and sequentially applying along the longest dimension of each of said teeth first a radial rolling pressure to the top portions thereof and thence a lateral ironing pressure to the adjacent leading sides thereof until the surfaces of said teeth subjected to said pressures create a cutting edge.

9. A method of forming a cutting edge upon a metallic article having a body portion and plurality of spaced projecting peripheral teeth thereupon comprising the step of applying alternate lateral and vertical pressures along the longest dimension of each of said teeth until an edge is produced thereupon.

10. A method of forming cutting edges upon a metallic article having a substantially cylindrical body portion and a plurality of spaced projecting peripheral helical teeth thereupon and a fluted portion between each pair of adjacent teeth, each of said teeth having a fixed helical angle; comprising the steps of obtaining a sharpening member also having a substantially cylindrical body portion and a plurality of spaced projecting helical peripheral teeth thereupon, said sharpening member being made of harder material than said metallic article, each of said helical teeth upon said sharpening member also having a fixed helical angle but smaller than the helical angle of the teeth of said metallic article, thence placing the teeth of said sharpening member between the teeth of said metallic article and in rotatable pressure impingement therewith, so that alternate lateral and radial pressures are produced along each of said teeth and cutting edges are produced thereupon.

11. A method of forming cutting edges upon a metallic article having a substantially cylindrical and partially conical body portion and a plurality of spaced projecting peripheral helical teeth thereupon, said teeth having a helical angle of from 30 to 60 degrees, comprising the step of applying alternate and lateral and radial pressures longitudinally along each of said teeth until cutting edges are produced upon the portion subjected to said alternate pressures.

12. A method of forming cutting edges upon a metallic article having a substantially cylindrical body portion and a plurality of spaced projecting peripheral helical teeth thereupon, a flute portion between each pair of adjacent teeth, each of said teeth having a fixed helical angle; comprising the steps of obtaining a sharpening member also having a substantially cylindrical body portion and a plurality of spaced projecting helical teeth thereupon, a flute portion between each pair of adjacent teeth, each of said second-named helical teeth also having a fixed helical angle but different than the helical angle of the teeth of said metallic article, thence placing the teeth of said sharpening member between the teeth of said metallic article and in rotatable pressure impingement therewith, so that alternate lateral and radial pressures are produced along each of said teeth and cutting edges are produced thereupon.

13. A method of forming cutting edges upon a metallic article having a substantially cylindrical body portion and an odd number of spaced projecting peripheral helical teeth thereupon, each of said teeth having a fixed helical angle; comprising the steps of obtaining a pair of sharpening members also having substantially cylindrical body portions and a plurality of spaced projecting helical teeth thereupon, each of said second-named helical teeth also having a fixed helical angle but different than the helical angle of the teeth of said metallic article, thence placing said metallic article between said pair of sharpening members with the teeth of said sharpening members between the teeth of said metallic article and in rotatable pressure impingement therewith, so that alternate lateral and radial pressures are produced along each of said teeth and cutting edges are produced thereupon.

14. A method of forming cutting edges upon a metallic article having a substantially cylindrical body portion and an odd number of spaced projecting helical teeth thereupon, each of said teeth having a fixed helical angle, each of said teeth also having a leading side and a following side; comprising the steps of obtaining a sharpening member also having a substantially cylindrical body portion and a plurality of spaced projecting helical teeth thereupon, each of said second-named helical teeth also having a fixed helical angle but different than the helical angle of the teeth of said metallic article, each of said second-named helical teeth also having a leading side and a following side, thence placing the teeth of said sharpening member and the teeth of said metallic article in rotatable pressure impingement with one another, so that alternate lateral and radial pressures are produced along each of the teeth of said metallic article and cutting edges are produced on the leading sides thereupon.

15. A method of forming cutting edges upon a metallic article having a substantially cylindrical body portion and an odd number of spaced projecting helical teeth thereupon, each of the teeth having a fixed helical angle, each of the teeth also having a leading side and a following side; comprising the steps of obtaining a pair of sharpening members, each of said sharpening members also having a substantially cylindrical body portion and a plurality of spaced projecting helical teeth thereupon, each of said second-named helical teeth also having a fixed helical angle but smaller than the helical angle of the teeth of said metallic article, each of said second-named helical teeth also having a leading side and a following side, thence placing said metallic article between said pair of sharpening members, with the teeth of said sharpening members between the teeth of said metallic article and said sharpening members and metallic article being in rotatable pressure impingement with one another, so that alternate lateral and radial pressures are produced along each of the teeth of said metallic article and cutting edges are produced thereupon.

16. A method of forming cutting edges upon a metallic article having a substantially cylindrical body portion and an odd number of spaced projecting helical teeth thereupon, each of the teeth having a fixed helical angle, each of the teeth also having a leading side and a following side; comprising the steps of obtaining a pair of sharpening members, each of said sharpening members also having a substantially cylindrical body portion and a plurality of spaced projecting helical teeth thereupon, each of said second-named helical teeth also having a fixed helical angle but smaller than the helical angle of the teeth of said metallic article, wherein the spacing between each of said second-named helical teeth is at least twice the spacing between said first-named helical teeth, each of said second-named helical teeth also having a leading side and a following side, thence placing said metallic article between said pair of sharpening members, with the teeth of said sharpening members lying between the teeth of said metallic article and the leading sides of the teeth of said sharpening members being in rotatable pressure impingement with the leading sides of the teeth of said metallic article, so that alternate lateral and radial pressures are produced along each of the teeth of said metallic article and cutting edges are produced thereupon.

17. A method of forming cutting edges upon a metallic article as set forth in claim 12 wherein the helical angular difference between the metallic article and the sharpening members is of a range from 15 seconds to 5 degrees.

18. A method of forming cutting edges upon a metallic article as set forth in claim 12 wherein the helical angular difference between the metallic article and sharpening members is 30 minutes.

19. A method of forming cutting edges upon a metallic article as set forth in claim 12 wherein the shape of the teeth of said sharpening members is substantially complementary to the shape of the flute portions of said metallic article.

20. A method of forming cutting edges upon a metallic article having a substantially cylindrical body portion and an odd number of spaced projecting helical teeth thereupon comprising the steps of obtaining a sharpening member also having a substantially cylindrical body portion and a plurality of spaced projecting helical teeth thereupon, wherein the spacing between adjacent teeth of said sharpening member is at least twice that as obtains between the corresponding teeth of said metallic article and the helical angle of each of the teeth of said sharpening member is less than the corresponding helical angle of each of the teeth of said metallic article, thence placing said sharpening member and metallic article into rotatable pressure impingement with one another so that alternate lateral and radial pressures are produced along each of the teeth of said metallic article and cutting edges are produced thereupon.

21. A method of forming cutting edges upon the teeth of a metallic article having a substantially cylindrical body portion and a plurality of spaced projecting helical teeth thereupon each having a top portion and a side portion, comprising the steps of obtaining a sharpening member also having a substantially cylindrical body portion and an odd number of spaced projecting helical teeth thereupon, but wherein the spacing between adjacent teeth of said sharpening member is at least twice the spacing between adjacent teeth of said metallic article and the helical angle of the teeth of said sharpening member being different than the helical angle of the teeth of said metallic article; each of the teeth of said sharpening member having root and crown portions and an adjacent laterally extending shoulder portion terminating short of said crown portion; thence placing said sharpening member and metallic article into rotatable pressure impingement with one another with a side portion of a tooth of said sharpening member engageable with a side portion of a tooth of said metallic article and a shoulder portion of a tooth of said sharpening member engageable with a top portion of a tooth of said metallic article so that alternate lateral ironing and radial rolling pressures are produced along each of the teeth of said metallic article and cutting edges are produced thereupon.

22. A method of forming cutting edges upon the teeth of a metallic article having a substantially cylindrical body portion and an odd number of spaced projecting helical teeth thereupon each having top and side portions, comprising the steps of obtaining a sharpening member also having a substantially cylindrical body portion and a plurality of spaced projecting helical teeth thereupon, but wherein the spacing between adjacent teeth of said sharpening member is at least twice the spacing between adjacent teeth of said metallic article and the helical angle of the teeth of said sharpening member is different than the helical angle of the teeth of said metallic article; each of the teeth of said sharpening member having root and crown portions and an adjacent laterally extending shoulder portion terminating short of said crown portion and being at least as wide, at its terminal portion, as the top portion of the engaged tooth of said metallic article; thence placing said sharpening member and metallic article into rotatable pressure impingement with one another with a side portion of a tooth of said sharpening member laterally engageable with a side portion of a tooth of said metallic article and a shoulder portion of a tooth of said sharpening member downwardly engageable with a top portion of a tooth of said metallic article so that alternative lateral ironing and radial rolling pressures are produced along each of the teeth of said metallic article and cutting edges are produced thereupon.

23. A method of forming cutting edges upon the teeth of a metallic article having a substantially cylindrical body portion, a plurality of spaced projecting helical teeth thereupon, and a flute portion between each pair of adjacent teeth, each of said teeth also having a leading side portion, a following side portion, and a top portion; comprising the steps of obtaining a sharpening member also having a substantially cylindrical body portion and a plurality of spaced projecting helical teeth thereupon, but wherein the spacing between adjacent teeth of said sharpening member is at least twice the spacing between adjacent teeth of said metallic article and the helical angle of the teeth of the sharpening member is less than the helical angle of the teeth of said metallic article; each of the teeth of said sharpening member having a root portion, a crown portion, a leading side portion, a following side portion and an adjacent laterally extending shoulder portion terminating short of said crown portion being at least as wide as the top portion of the engageable tooth of said metallic article, and being downwardly inclined towards the following side portion of said tooth; thence placing said sharpening member and said metallic article into rotational pressure impingement with one another with a leading side portion of a tooth of said sharpening member laterally engageable with a leading side portion of a tooth of said metallic article and the shoulder portion of a tooth of said sharpening member downwardly engageable with a top portion of a tooth of said metallic article so that alternate lateral ironing and radial rolling pressures are produced along each of the teeth of said metallic article and cutting edges are produced thereupon.

24. A method as set forth in claim 23 wherein a pair of sharpening members are disposed upon either side of said metallic article.

25. A method of forming cutting edges upon a metallic article having a substantially cylindrical body portion and a plurality of spaced projecting peripheral helical teeth thereupon, each of said teeth having a fixed helical angle, comprising the steps of obtaining a sharpening member also having a substantially cylindrical body portion and a plurality of spaced projecting peripheral helical teeth thereupon, each of said teeth of said sharpening member having at least twice the spacing of said teeth of said metallic article, and also having a definite helical angle but different than the helical angle of the teeth of said metallic article, thence placing said sharpening member into rotatable pressure impingement with said metallic article so that alternate lateral and radial pressures are produced along each of said teeth and cutting edges are produced thereupon.

No references cited.